United States Patent [19]

Mischler et al.

[11] Patent Number: 4,843,629
[45] Date of Patent: Jun. 27, 1989

[54] METHOD OF LOCATING PAIRS OF CURVED PARALLEL LINES IN AN IMAGE

[75] Inventors: Denis Mischler, Acigne; Jean Yves Catros, Rennes, both of France

[73] Assignee: Thomson-CSF, France

[21] Appl. No.: 228,798

[22] Filed: Aug. 1, 1988

Related U.S. Application Data

[63] Continuation of Ser. No. 930,575, Nov. 14, 1986, abandoned.

[30] Foreign Application Priority Data

Nov. 15, 1985 [FR] France .................................. 85 16939

[51] Int. Cl.$^4$ .............................................. G06K 9/00
[52] U.S. Cl. ............................................ 382/6; 382/54
[58] Field of Search ...................................... 382/6, 54

[56] References Cited

PUBLICATIONS

"Context Coding and Recognition By Means of Regeneration Rules", Fourth Conference on Pattern Recognition and Artifical Intelligence, vol. 1, Jan. 25–27 1984, Camillerapp et al.
Proceedings of the 5th International Conference on Pattern Recognition, 1–4 Dec. 1980, pp. 383–385, IEEE Fukui et al., "Detection and Tracking . . .".
"A Computer Method of Understanding Ocular Fundus Images", Pattern Recognition, vol. 15, No. 6, 1982, pp. 431–443, Akita et al.
"Edge Segment Linking Based on Gray Level and Geometrical Compatibilities", Pattern Recognition, vol. 15, No. 5, 1982, pp. 369–377, Tavakolz et al.

Primary Examiner—Leo H. Boudreau
Assistant Examiner—Donald J. Daley
Attorney, Agent, or Firm—Cushman, Darby & Cushman

[57] ABSTRACT

The invention provides a method of locating pairs of parallel curved lines in an image, consisting in representing the image in the form of straight line segments, in forming from these segments elementary sections of parallel segments, in assembling together the related elementary sections so as to form vessels or vessel portions and filtering the vessels thus formed for eliminating the parasite vessels.

9 Claims, 4 Drawing Sheets

ORIGIN 1 x――ʃ²³――― EDGE N°1 ―――x

ORIGIN 2 x――ᴛ₂₄――― EDGE N°2 ―――x

METHOD OF LOCATING PAIRS OF CURVED PARALLEL LINES IN AN IMAGE

This is a continuation of application Ser. No. 930,575, filed Nov. 14, 1986, which was abandoned upon the filing hereof.

BACKGROUND OF THE INVENTION

The present invention relates to a method or process of locating pairs of curved parallel lines in an image. It applies more particularly to the recognition of vessels in digital angiography but may also be applied to the analysis of aerial views for recognizing rivers and roads.

Angiography is a process for the visual analysis of blood vessels. Its principle consists in X raying the observation zone, before then after, the injection of a product opaque to X rays. The logarithmic difference of these two images allows a well contrasted image of the zones to be obtained of the vascular network where the product has spread, if there has been no movement between the two images. The support for these images is formed either by a photographic film or by a digital image memory.

The photographic film is used in traditional angiography, it has the advantage of providing images of high definition but has the drawback of requiring fairly long operating times, related to the processing of the photographic support.

The digital image memory is used in digital angiography, it allows an analysis to be made practically in real time but it supplies an image or poorer definition than that obtained in traditional angiography.

SUMMARY OF THE INVENTION

The aim of the invention is to overcome the above mentioned drawbacks.

For this, the invention provides a method of locating pairs of curved parallel lines in an image which consists in representing the image in the form of straight line segments, in forming elementary sections of parallel segments from these segments, in assembling the elementary sections so as to form vessels or vessel portions and to filter the vessels thus formed so as to eliminate parasite vessels.

Besides the fact that this method gives good results for representing vessels in digital angiography, it has the further advantage that it allows representation of the data in the form of a system of a type well known in data processing under the name of expert system, allowing ready adaptation to other potential applications. In this system in fact the representation of the data is made on several levels by defining for each level rules of transformation allowing it to pass from an initial base of facts to the level which is directly superior thereto. The starting data is in the form of a list of segments defined by their coordinates in the plane of the image and by their mean luminance values and the rules of transformation provide for the assembly of the segments so as to form elementary vessel sections which are themselves assembled together to form longer sections with possible bridging.

BRIEF DESCRIPTION OF THE DRAWINGS

Other features and advantages of the invention will be clear from the following description with reference to the accompanying drawings in which:

FIG. 3 illustrates the formation of a section, FIGS. 4a to 4d illustrate the rules for forming a vessel.

DESCRIPTION OF THE PREFERRED EMBODIMENT

Figure 1:
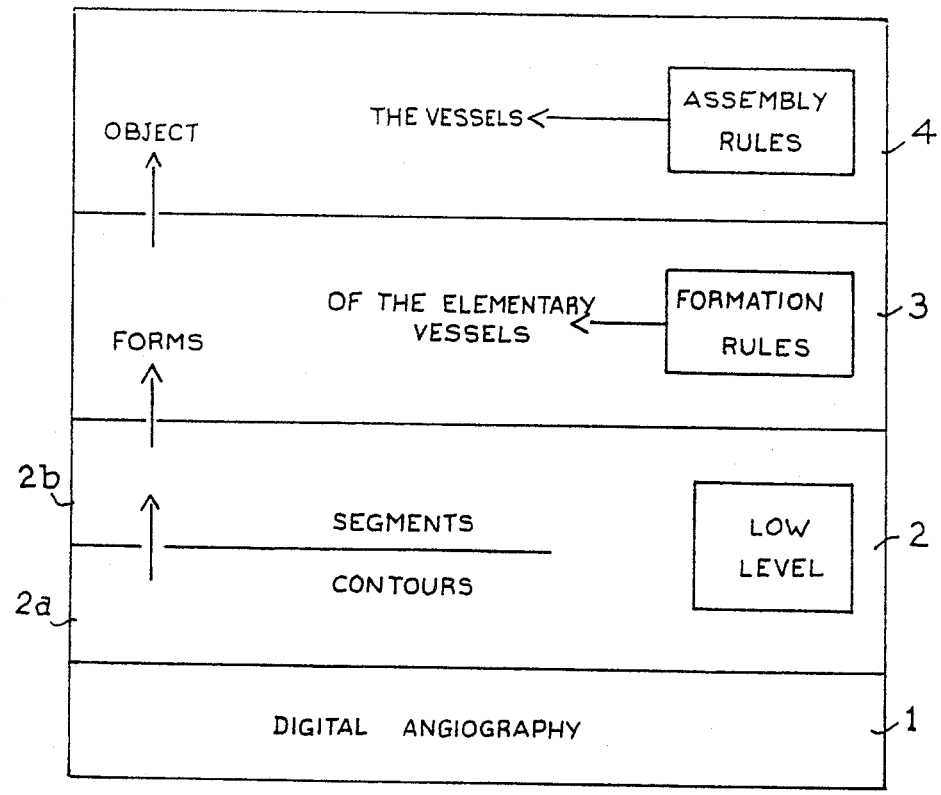
FIG. 1 shows the principle of analysing an audio graphic image in accordance with the invention.

So as to be able to find again the main vessel contained in a digital angiographic image the method of the invention distinguishes in the analysis of the image several levels of representation while respecting a hierarchic structure of the type shown in the table of FIG. 1. In this table, four herarchical levels are shown, level 1 corresponds to the acquisition of data relative to the angiographic image supplied for example by a digital angiographic apparatus, of the type known for example under the name DIVAS and manufactured by the French Company CGR a subsidiary of the firm THOMSON-CSF, which allows an image definition to be obtained of 512 by 512 points, each point being coded digitally over a length of eight bits. Level 2 uses so called low level procedures well known in digital image formation which allows the two dimensional images to be transformed into an assembly of segments defining the contours which characterize the image. Level 3 elaborates the elementary vessel sections using rules of formation which will be set forth hereafter and level 4 elaborates the vessels from the sections obtained in level 3 using rules for assembly of different sections obtained in level 3.

The data required for processing the image are collected in level 2 in an initial base of facts in the form of a list of coordinates defining segments oriented by their points of origin and end. The orientation of the segments is such that the zone with lowest luminance is at the left. To each of these segments is attached a list of properties defining:

(1) a mean luminance level $Y_i$, (2) a label E common to all the segments which form a connected contour zone, (3) the orientation $\theta_i$ of each segment, in the plane defined within $2k\pi$, (4) coefficients ($a_i$, $b_i$) which define the straight line supporting the segment, (5) the length $L_i$.

The recognition of the vessel begins by the recognition of the elementary sections which is carried out at level 3. This recognition takes place following steps 5 to 19 of the flow chart of FIG. 2, by which it can be recognized that two segments belong to the same section. In this flow chart, the data relative to each segment ($Y_i$, E, $\theta_i$, ($a_i b_i$) and $L_i$) which are gathered together in steps 6 and 7 are compared in the following steps 8 to 19 with corresponding values of the adjacent segments so as to define whether the set of two segments on which these comparisons are carried out form part of a common section or of an elementary vessel portion. From these tests it can be checked whether two segments have:

(1) identical luminance values $Y_{i-1}$ and $Y_i$ within $\epsilon$ (test of steps 8 and 9)

(2) orientations $\theta_{i-1}$ and $\theta_i$ such that $|\theta_{i-1}-\theta_i|=0$ mod $\pi$ without having any common point (test of steps 11 and 12).

(3) orthogonal projections of one on the other, one of which at least is not empty (steps 13 and 14)

(4) average spacing, defined by the mean of the distances of the projections of the ends of one on the other, included between the "minimum diameter" $d_{min}$ and "maximum diameter" $d_{max}$ values (steps 15 and 16), (5) an arrangement so that the segments are one on the left of the other (steps 17 and 18) and (6) a mean luminance value over a virtual segment equidistant from the two segments considered less than the mean luminance level which is proper to them, so as to avoid false associations implying real vessels but which are parallel and fairly close together, then they form an elementary vessel section defined in the way indicated in FIG. 3 by an edge 1 designated by 23 and an edge 2 designated by 24 defined by coordinates of origin and end, origin 1 end 1 for edge 1 and origin 2 and end 2 for edge number 2, with a mean diameter attribute which is equal to the mean distance of orthogonal projections of the ends of one on the other.

Figure 2:
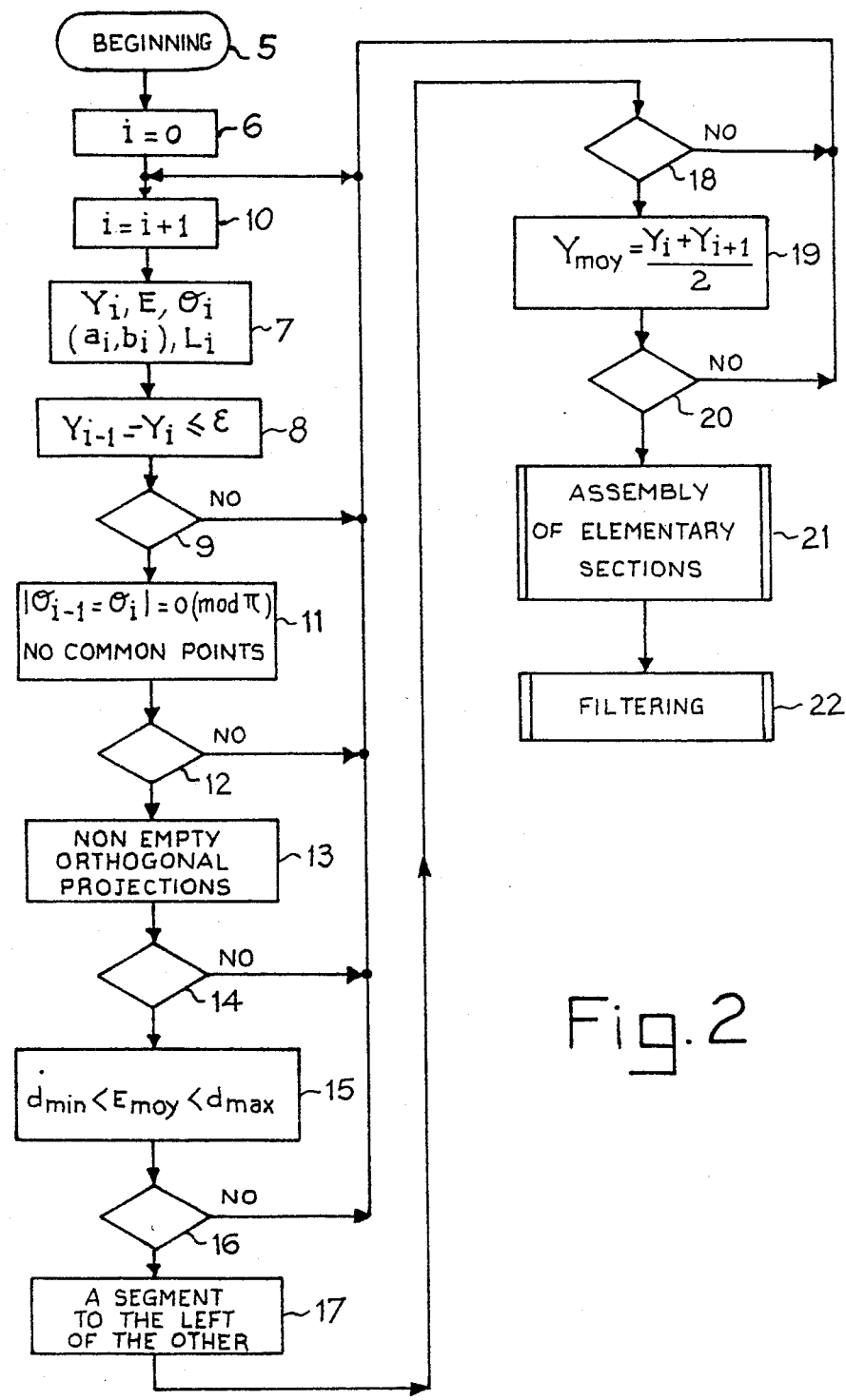
FIG. 2 is a flow chart illustrating the phases of location of elementary portions and construction of vessels.

The method continues in steps 21 and 22 of FIG. 2 by assembling elementary sections, carried out in step 21 and by filtering carried out in step 22. The elementary sections are assembled in step 21 while respecting the four following rules which are illustrated with reference to FIGS. 4a to 4d.

Rule No. 1, which is illustrated in FIG. 4a, sets forth the fact that if two elementary forms or two vessel portions, $T_1$, $T_2$, are in the direct extension one of the other because of the connexity of their edges $23_1$, $23_2$ and $24_1$, $24_2$ taken two by two, then they form a vessel or a vessel portion.

Rule No. 2, which is illustated in FIG. 4b sets forth the fact that if two elementary forms or two vessel portions, $T_1$, $T_2$, may be placed in the extension one of the relatedness of their two edges ($24_1$, $24_2$) and by the presence of one (or n with n remaining small) segment 25 which connect together the two edges ($23_1$, $23_2$) not directly related then they form a vessel or vessel portion.

Rule No. 3, which is illustrated in FIG. 4c sets forth that if two elementary forms or vessel portions, $T_1$, $T_2$, may be placed in the extension one of the other either because of the relatedness of two of the edges $23_1$, $23_2$, or because of the presence one (or n, with n remaining small) segment joining together two edges ($24_1$, $24_2$) not directly related, and provided a short segment 26 is added which fills up a small hole and which separates the other distinct edges, then they form a vessel or a vessel portion.

Rule No. 4, which is illustrated in FIG. 4d, sets forth the fact that if two elementary forms or two vessel portions may be placed in the extension one of the other, because of the relatedness of two of the edges, or because of the presence of one, (or n, with n remaining small) segment joining together two edges not directly related, and provided that a segment is added which closes what is called a hole and which separates two other well defined edges, and if the added segment 26 forms an elementary section with segments $24_1$, $24_2$, representative of the connection of the other edges, then they form a vessel or a vessel portion.

These rules may be put into effect by programming in a data processing machine, of type VAX 750 of digital equipment for example, by executing a test procedure on the relatedness of two section edges, a procedure for locating a segment chain connecting two edges together by end points of these edges, a procedure for checking the whole diameter, a procedure for adding a segment for closing a hole so as to alow rule No. 4 to be carried out, a procedure for creating a new section resulting from the association of two sections a procedure for creating a new section and a procedure for updating on the facts base. These procedures could be written using for example the language known under the designations Lisp (or NIL or MIT).

The procedure for testing for the relatance of two section edges for establishing that two section edges are related when (a) one of the sections is included in the other in the sensein which the segments forming it are a subassembly of those of the container, (b) there is a common end, (c) the intersection of the assemblies of constituent segments is not empty and forms a succession of well related segments including an end segment of each of the edges so as to respect the direction thereof, (d) the resultant edge ensures for the set of segments which it forms a direction compatible with all these segments (two consecutive segments going in the same direction).

The procedure for locating a segmented chain consists in searching in the list of source segments for a chain of n segments connecting two edges together by two end points of these edges. Additional conditions concerning the chain of the segments of the connection may be imposed and it may be provided for example that there is no untimely about turn, that is to say that two consecutive segments must always have a positive or zero scalar product.

The procedure for checking the diameter of a hole is a procedure which checks the dimensional conditions of the diameters of the holes. It makes possible the execution of rule No. 3.

The procedure for adding a segment for closing a hole allows rule No. 4 to be carried out, namely the formation of an elementary section with one of the segments representative of the relatedness of two edges and a limitation concerning the size of the hole. The segments representative of the relatedness of two edges are formed either by the two segments situated on each side of the point common to the two edges, if the two edges only touch by their end points, or the segments which form the connection, if the two edges do not touch directly but are connected by a small number of segments, or else are formed by the segments forming the intersection of their constituent segments, if the two edges have at least one of their end segments common.

The procedure for creating a new section leads to the association of two sections by checking for non overlapping of these edges.

The creation of new segments, with the possible concordance of the elements of the low level hierarchical structure allows it to be discovered whether it is possible to provide bridging between two contour ends. This procedure of creating new segments ends in the procedure updating the facts base.

The strategy of analysing the segments of the image so as to form the vessels consists in linking up the above defined rules in the following way. This strategy always begins by executing the rule for forming the elementary sections of the vessels and is followed by execution of rules No. 1 to No. 4. Rules No. 1 and No. 2 are applied to any pair of vessel portions until there is invariance of the facts base. Rules No. 3 and No. 4 are applied to any pair of vessel portions they are followed by the execution of rule No. 1 until there is invariance of the facts base. Finally, the execution of the whole of these rules is followed by the execution of a filtering procedure which consists in selecting a vessel according to criteria of shape and importance. This may be carried out using the four following filtering processes:

(1) in a first filtering technique the vessels entirely included in others are deleted from the facts base, (2) in a second filtering technique the vessels having one of their edges included in one of the edges of another vessel and the second edge of which is shorter than the length of the second edge of the other vessel are deleted from the facts base, (3) in a third technique, the elementary vessel portions are not kept as vessels, (4) and finally, in a fourth technique, the vessels having defects of form of the type: disproportion of the length of the edges or having a diameter appreciably greater than the length are deleted from the facts base.

The four filters are successively applied to the facts base and their role is to eliminate the parasite vessels or false vessels which appear during processing.

To form such filters, a certain number of thresholds which have already appeared in the statement of the rules are to be defined by the operator, but the choice of their value may be included in the strategic control rules. These thresholds may in particular be defined by the minimum and maximum diameters of the vessels, the diameter of the holes for carrying out rules No. 3 and No. 4, other thresholds possibly having relatively frozen values so as to define: a tolerance concerning the orientation of the segments or a tolerance concerning luminance deviations so as to allow rule No. 1 of the form level to be carried out.

Figure 5A:
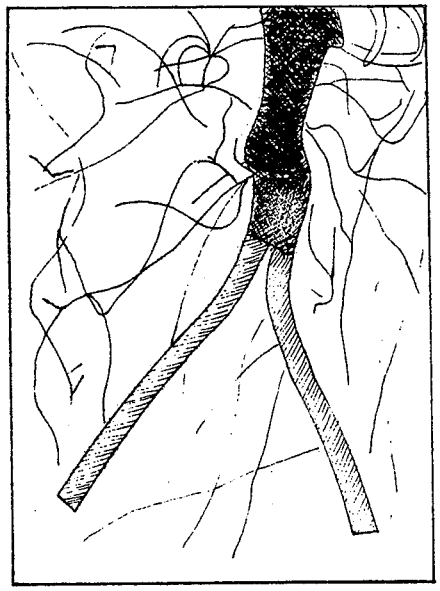
FIGS. 5a to 5c are representations of angiographic images obtained 1, 5a, by the photographic method and the others, 5b and 5c by the method of the invention.
Figure 5B:
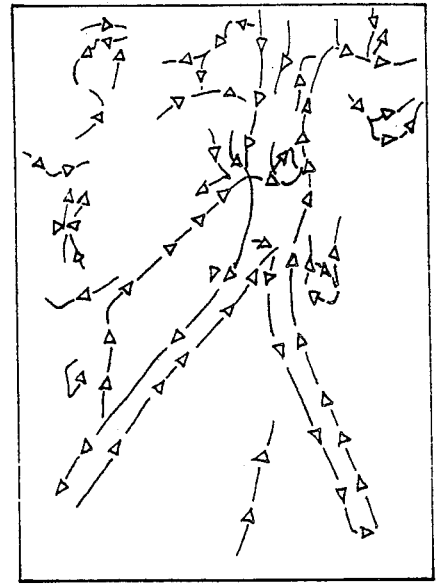
Figure 5C:
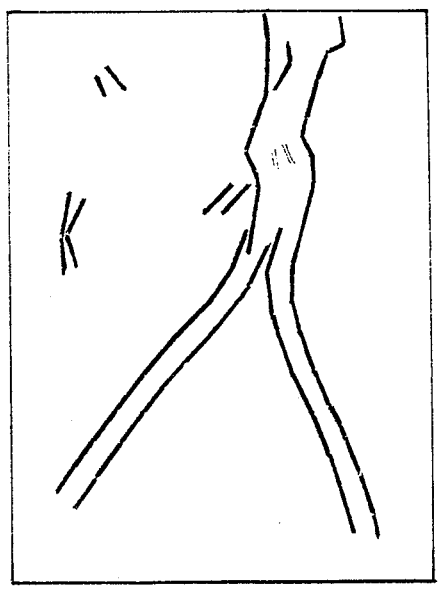

Results obtained in applying the method of the invention are shown in FIGS. 5a, 5b and 5c where it is possible to compare the graphism of vessels obtained in FIGS. 5b and 5c with the image obtained of a photograph of the same vessels, using X rays in conventional angiography. These images were provided by a computer VAX 750 programmed in accordance with the method of the invention in a Lisp language.

What is claimed is:

1. A method of locating pairs of parallel curved lines in an image, comprising the steps of:

representing the image in the form of straight line segments, forming these segments into elementary sections of parallel segments, said step of forming elementary sections, including selecting two segments able to form a section when, simultaneously, the luminance values are substantially identical, the orientations $\theta_1$ and $\theta_2$ are equal within $k\pi$ and they do not have any common point, the orthogonal projections of one on the other overlap, they have an average spacing between the minimum and maximum diameter values tolerated for a vessel, they are disposed so that the segments are one at the left of the other, and they have a mean luminance value less than the mean luminance value which is proper to them, assembling the related elementary sections so as to form vessels or vessel portions, and filtering the vessels thus formed for eliminating parasite vessels.

2. The method as claimed in claim 1, wherein said step of assembling the elementary sections so as to form a vessel or a vessel portion is performed when the elementary sections are in the direct extension of each other because of the relatedness of their edges.

3. The method as claimed in claim 1, wherein the step of assembling together the elementary sections so as to form a vessel or vessel portion is performed when the elementary sections may be placed in extension of one another because of the relatedness of two of their edges and by the presence of a segment which connects two edges not directly related.

4. The method as claimed in claim 1, wherein the step of assembling together the elementary sections so as to form a vessel or a vessel portion is performed when the elementary sections may be placed in extension of one another, because of at least one of the relatedness of two of the edges and by the presence of a segment connecting together two edges not directly related and a short segment can be added to close a hole between two other very distinct edges.

5. The method as claimed in claim 1, wherein the step of assembling together the elementary sections so as to form a vessel or a vessel portion is performed when the elementary sections may be placed in the extension of one another because of at least one of the relatedness of two of the edges and by the presence of a segment connecting together two edges not directly related and a segment can be provided which closes a hole between two other very distinct edges and the added segment forms an elementary section with the segment representative of the connection of the other two edges.

6. The method as claimed in claim 1, further comprising filtering for eliminating the vessels entirely included in others.

7. The method as claimed in claim 1, further comprising filtering for eliminating the vessels having one of their edges included in one of the edges of another vessel and the second edge of which is of a length less than the length of the second edge of the other vessel.

8. The method as claimed in claim 7, further comprising filtering the elementary vessel portions.

9. The method as claimed in claim 1, further comprising deleting the vessels having defects of shape.

* * * * *